United States Patent
Sugimori et al.

(10) Patent No.: US 11,509,021 B2
(45) Date of Patent: Nov. 22, 2022

(54) NONAQUEOUS ELECTROLYTE SECONDARY BATTERY

(71) Applicant: Panasonic Intellectual Property Management Co., Ltd., Osaka (JP)

(72) Inventors: Masanori Sugimori, Hyogo (JP); Yasunori Baba, Hyogo (JP); Katsunori Yanagida, Hyogo (JP); Nobuhiro Hirano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 167 days.

(21) Appl. No.: 16/637,026

(22) PCT Filed: Jul. 27, 2018

(86) PCT No.: PCT/JP2018/028176
§ 371 (c)(1),
(2) Date: Feb. 6, 2020

(87) PCT Pub. No.: WO2019/044308
PCT Pub. Date: Mar. 7, 2019

(65) Prior Publication Data
US 2020/0203693 A1    Jun. 25, 2020

(30) Foreign Application Priority Data

Aug. 29, 2017  (JP) .............................. JP2017-164772

(51) Int. Cl.
*H01M 4/00*      (2006.01)
*H01M 50/46*    (2021.01)
(Continued)

(52) U.S. Cl.
CPC ........... *H01M 50/46* (2021.01); *H01M 4/136* (2013.01); *H01M 50/431* (2021.01); *H01M 50/44* (2021.01)

(58) Field of Classification Search
CPC . Y02E 60/10; H01M 10/0525; H01M 50/431; H01M 10/4235; H01M 4/136
See application file for complete search history.

(56) References Cited

U.S. PATENT DOCUMENTS

| | | |
|---|---|---|
| 2009/0155677 A1 | 6/2009 | Maeda et al. |
| 2014/0287295 A1 | 9/2014 | Honda et al. |

(Continued)

FOREIGN PATENT DOCUMENTS

| | | |
|---|---|---|
| CN | 103918104 A | 7/2014 |
| JP | 2009-146610 A | 7/2009 |

(Continued)

OTHER PUBLICATIONS

International Search Report dated Oct. 23, 2018, issued in counterpart Application No. PCT/JP2018/028176 (2 pages).

(Continued)

*Primary Examiner* — Cynthia H Kelly
*Assistant Examiner* — Monique M Wills
(74) *Attorney, Agent, or Firm* — WHDA, LLP

(57) ABSTRACT

A nonaqueous electrolyte secondary battery includes a positive electrode, a negative electrode and a separator disposed between the positive electrode and the negative electrode, wherein the separator includes an inorganic filler layer which includes a first filler layer containing phosphate salt particles and a second filler layer disposed on the first filler layer and containing inorganic particles more heat resistant than the phosphate salt particles, and the BET specific surface area of the phosphate salt particles is in the range of not less than 5 $m^2/g$ and not more than 100 $m^2/g$.

5 Claims, 2 Drawing Sheets

(51) Int. Cl.
    *H01M 4/136*     (2010.01)
    *H01M 50/44*     (2021.01)
    *H01M 50/431*     (2021.01)

(56)     References Cited

U.S. PATENT DOCUMENTS

| | | |
|---|---|---|
| 2014/0322586 A1 | 10/2014 | Lee et al. |
| 2014/0356695 A1 | 12/2014 | Abe et al. |
| 2015/0197830 A1* | 7/2015 | Chon .................. C22B 26/12 |
| | | 423/179.5 |
| 2015/0280197 A1* | 10/2015 | Zhao .................. H01M 50/411 |
| | | 429/144 |
| 2016/0064711 A1* | 3/2016 | Zhao .................. B29C 48/91 |
| | | 264/45.9 |
| 2017/0104246 A1 | 4/2017 | Takeda |

FOREIGN PATENT DOCUMENTS

| | | |
|---|---|---|
| JP | 2014-67693 A | 4/2014 |
| JP | 2015-15096 A | 1/2015 |
| JP | 2015-524991 A | 8/2015 |
| JP | 2016-72120 A | 5/2016 |
| JP | 2017-63041 A | 3/2017 |
| JP | 2017-76484 A | 4/2017 |

OTHER PUBLICATIONS

Extended Search Report dated Jul. 2, 2020, issued in counterpart EP Application No. 18849951.1 (8 pages).
English Translation of Search Report dated Dec. 20, 2021, issued in counterpart CN Application No. 201880053909.X. (2 pages).

* cited by examiner

NONAQUEOUS ELECTROLYTE SECONDARY BATTERY

TECHNICAL FIELD

The present disclosure relates to techniques of nonaqueous electrolyte secondary batteries.

BACKGROUND ART

For example, PTL 1 proposes a nonaqueous electrolyte secondary battery that includes a positive electrode, a negative electrode and a separator disposed between the positive electrode and the negative electrode, the separator including a porous sheet and an inorganic filler layer containing inorganic particles which is disposed on the porous sheet.

CITATION LIST

Patent Literature

PTL 1: Japanese Published Unexamined Patent Application No. 2017-63041

SUMMARY OF INVENTION

Incidentally, nonaqueous electrolyte secondary batteries can generate heat in the event of abnormalities such as overcharging, internal short-circuits, external short-circuits, and excessive resistance heating stemming from the passage of large currents. The shutdown function of separators is known as one of the conventional techniques for suppressing the heat generation from nonaqueous electrolyte secondary batteries. According to the shutdown function, a separator is melted by the heat from the battery tri close (shutdown) pores in the separator itself and thereby to interrupt communications such as ion conduction between the positive and negative electrodes, and the charging and discharging of the battery is forcibly discontinued to suppress further generation of heat from the battery.

Unfortunately, the conventional separators are incapable of sufficiently interrupting communications such as ion conduction between positive and negative electrodes in the event of those abnormalities described above, and consequently sometime fail to reduce sufficiently the amount of heat generated from batteries.

An object of the present disclosure is therefore to provide a nonaqueous electrolyte secondary battery which generates a reduced amount of heat in the event of an abnormality in the battery.

A nonaqueous electrolyte secondary battery according to one aspect of the present disclosure includes a positive electrode, a negative electrode and a separator disposed between the positive electrode and the negative electrode, wherein the separator includes an inorganic filler layer which includes a first filler layer containing phosphate salt particles and a second filler layer disposed on the first filler layer and containing inorganic particles more heat resistant than the phosphate salt particles, the inorganic filler layer is of a laminated construction in order of the first filler layer and the second filler layer from a positive electrode side, the separator includes a porous sheet disposed on the inorganic filler layer, the inorganic filler layer being disposed between the porous sheet and the positive electrode, and the BET specific surface area of the phosphate salt particles is in the range of not less than 5 $m^2/g$ and not more than 100 $m^2/g$.

According to one aspect of the present disclosure, it is possible to reduce the amount of heat generated from a battery in the event of an abnormality in the battery.

DESCRIPTION OF EMBODIMENTS

Figure 1:
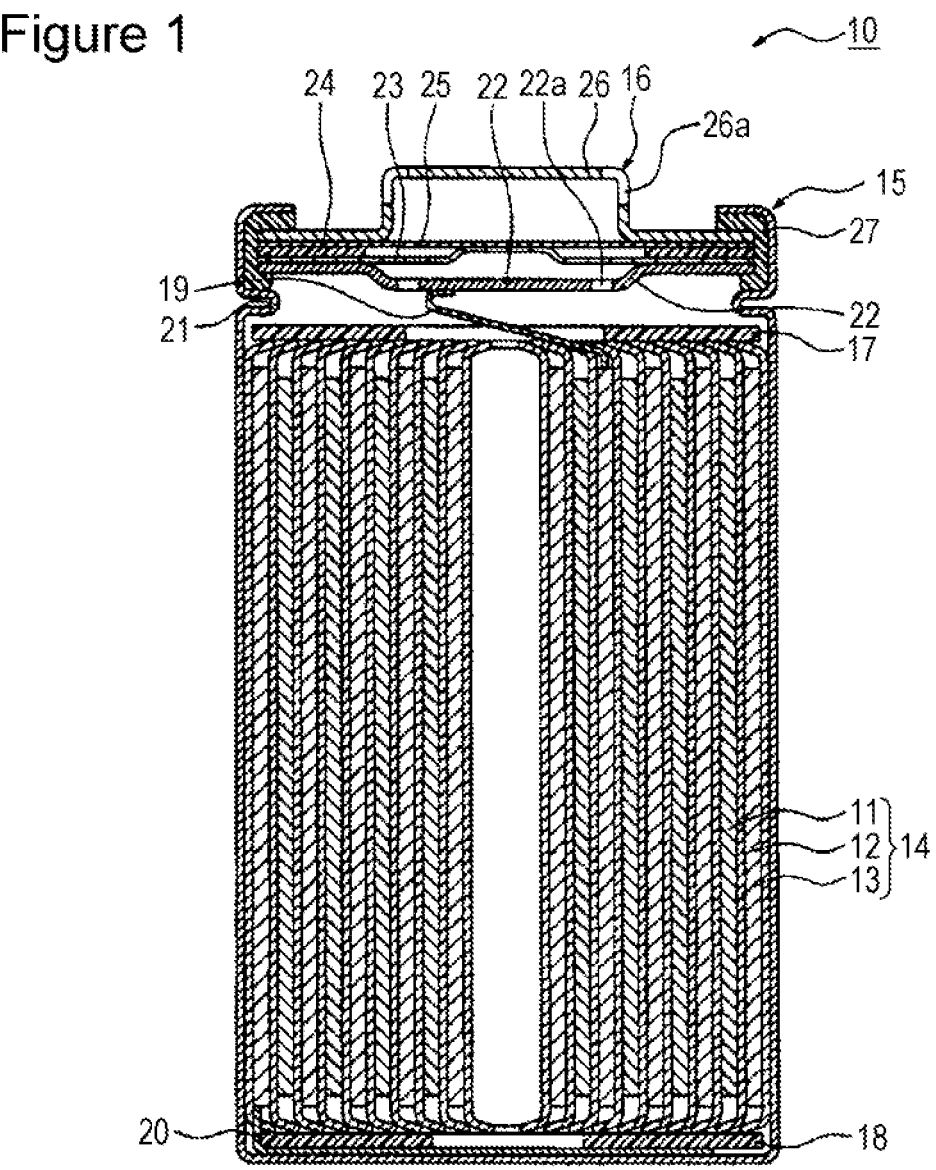
FIG. 1 is a sectional view of a nonaqueous electrolyte secondary battery according to an example embodiment.

For example, a conventional separator is composed of a porous sheet, and an inorganic filler layer which is disposed on the porous sheet and contains inorganic particles. The porous sheet is a resin film such as polyolefin and generally has the shutdown function described above. Thus, if a battery generates heat at the time of abnormality in the battery and the temperature inside the battery is raised, the porous sheet executes the shutdown function to interrupt communications such as ion conduction between the positive and negative electrodes, thus suppressing the generation of heat from the battery. However, recent batteries have an increased capacity and a higher energy density and the inside of the batteries becomes very hot (for example, 200° C. or above) in the event of battery abnormalities. As a result, for example, part of the porous sheet is lost at times. Because the conventional inorganic filler layer containing inorganic particles has no shutdown function unlike the porous sheet, the loss of the porous sheet, even if the inorganic filler layer containing inorganic particles remains there, results in a failure to interrupt sufficiently the communications such as ion conduction between the positive and negative electrodes, and the amount of heat generated from the battery cannot sometimes be reduced to a sufficient extent. The present inventors carried out extensive studies and have developed an inorganic filler layer which can interrupt communications such as ion conduction between positive and negative electrodes when the temperature inside the battery is raised in the event of an abnormality in the battery, thus reaching a nonaqueous electrolyte secondary battery which constitutes an aspect described below.

A nonaqueous electrolyte secondary battery according to one aspect of the present disclosure includes a positive electrode, a negative electrode and a separator disposed between the positive electrode and the negative electrode, wherein the separator includes an inorganic filler layer which includes a first filler layer containing phosphate salt particles and a second filler layer disposed on the first filler layer and containing inorganic particles more heat resistant than the phosphate salt particles, the inorganic filler layer is of a laminated construction in the order of the first filler layer and the second filler layer from the positive electrode side, the separator includes a porous sheet disposed on the inorganic filler layer, the inorganic filler layer being disposed between the porous sheet and the positive electrode, and the BET specific surface area of the phosphate salt particles is in the range of not less than 5 $m^2/g$ and not more than 100 $m^2/g$. As described above, the separator includes at least the bilaminar inorganic filler layer. According to this configuration, the inorganic filler layer interrupts communications such as ion conduction between the positive and negative electrodes at the time of battery abnormality to make it possible to reduce the amount of heat generated from the battery. Specifically, when the temperature inside the battery is raised in the event of a battery abnormality, the phosphate salt particles in the first filler layer are melted and moisten the inside of the second filler layer. In the second filler layer, the molten phosphate salt is polycondensed to close (shutdown) pores in the second filler layer, thereby interrupting the ion conduction between the positive and negative electrodes and reducing the amount of heat generated from the battery. In addition, the separator which is a combination of the bilaminar inorganic filler layer and the porous sheet such as polyolefin can lose the porous sheet when subjected to heat at the time of battery abnormality. Even in this case, the second filler layer having blocked pores as a result of the polycondensation of the phosphate salt interrupts the ion conduction between the positive and negative electrodes and reduces the amount of heat generated from the battery. Incidentally, heat is generated from the battery also when a combustible or combustion-supporting gas is generated from one of the positive electrode and the negative electrode due to the temperature rise within the battery and the gas migrates to and reacts with the other electrode. The second filler layer having blocked pores as a result of the polycondensation of the phosphate salt can interrupt the migration of such gas too.

Hereinbelow, an example embodiment will be described in detail. The drawings referred to in the description of the embodiment are only illustrative, and the configurations such as the size proportions of the constituent elements illustrated in the drawings may differ from those in the actual batteries.

FIG. 1 is a sectional view of a nonaqueous electrolyte secondary battery according to an example embodiment. The nonaqueous electrolyte secondary battery 10 illustrated in FIG. 1 includes a wound electrode assembly 14 formed by coiling a positive electrode 11 and a negative electrode 12 via a separator 13, a nonaqueous electrolyte, insulating plates 17, 18 disposed on and under the electrode assembly 14, respectively, and a battery case accommodating the above members. The battery case is composed of a bottomed cylindrical case body 15, and a seal body 16. Incidentally, the wound electrode assembly 14 may be replaced by other form of an electrode assembly such as a stacked electrode assembly in which positive electrodes and negative electrodes are stacked alternately on top of one another via separators. Examples of the battery cases include metallic cases such as cylindrical cases, prismatic cases, coin-shaped cases and button shaped cases, and resin cases (laminate batteries) formed by laminating resin sheets.

For example, the case body 15 is a bottomed cylindrical metallic container. A gasket 27 is disposed between the case body 15 and the seal body 16 to ensure tightness inside the battery case. The case body 15 preferably has an overhang 21 which is formed by, for example, pressing a lateral portion from the outside and which supports the seal body 16. The overhang 21 is preferably an annular portion which extends along the circumference of the case body 15, and supports the seal body 16 on the upper side thereof.

The seal body 16 has a filter 22 having a filter opening 22a, and a valve disposed on the filter 22. The valve (including a lower valve 23 and an upper valve 25) blocks the filter opening 22a in the filter 22, and is ruptured when the pressure inside the battery is raised by heat generation due to an abnormality such as internal short-circuiting. In the present embodiment, the lower valve 23 and the upper valve 25 are provided as the valve. Further, an insulating member 24 is disposed between the lower valve 23 and the upper valve 25, and a cap 26 having a cap opening 26a is also disposed. For example, the members constituting the seal body 16 have a disk shape or a ring shape, and the members except the insulating member 24 are electrically connected to one another. Specifically, the filter 22 and the lower valve 23 are connected to each other in the respective peripheral portions, and the upper valve 25 and the cap 26 are also connected to each other in the respective peripheral portions. The lower valve 23 and the upper valve 25 are connected to each other in the respective central portions, and the insulating member 24 is interposed between peripheral portions of the valve. In the event that the inner pressure is increased by heat generation due to an abnormality such as internal short-circuiting, for example, the lower valve 23 is ruptured at its thin portion to cause the upper valve 25 to expand away from the lower valve 23 toward the cap thereby interrupting the electrical connection between the valves.

In the nonaqueous electrolyte secondary battery 10 illustrated in FIG. 1, a positive electrode lead 19 attached to the positive electrode 11 extends toward the seal body 16 through a through-hole in the insulating plate 17, and a negative electrode lead 20 attached to the negative electrode 12 extends along the outside of the insulating plate 18 to the bottom of the case body 15. For example, the positive electrode lead 19 is connected by welding or the like to the lower side of the filter 22 that is a bottom plate of the seal body 16, and the cap 26 that is a top plate of the seal body 16 and is electrically connected to the filter 22 serves as a positive electrode terminal. The negative electrode lead 20 is connected by welding or the like to the inner side of the bottom of the case body 15, thus allowing the case body 15 to serve as a negative electrode terminal.

Hereinbelow, the separator, the positive electrode, the negative electrode and the nonaqueous electrolyte will be described in detail.

[Separators]

Figure 2:
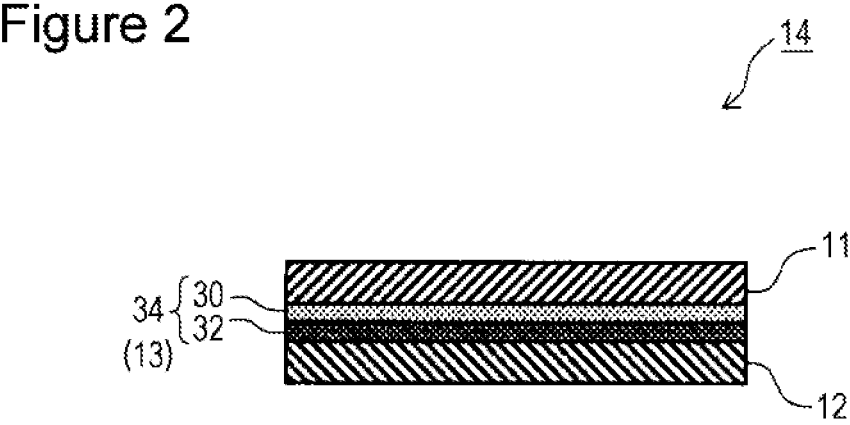
FIG. 2 is a partial enlarged sectional view illustrating an example of a wound electrode assembly illustrated in FIG. 1.

FIG. 2 is a partial enlarged sectional view illustrating an example of the wound electrode assembly illustrated in FIG. 1. In the electrode assembly 14 illustrated in FIG. 2, a separator 13 disposed between a positive electrode 11 and a negative electrode 12 is composed of an inorganic filler layer 34 that includes a first filler layer 30 containing phosphate salt particles, and a second filler layer 32 containing inorganic particles which are more heat resistant than the phosphate salt particles. That is, the inorganic filler layer 34 insulates the positive electrode and the negative electrode from each other, and ions such as lithium ions move between the positive and negative electrodes through the inorganic, filler layer 34 during the charging and discharging of the battery.

The phosphate salt particles contained in the first filler layer 30 are not particularly limited as long as the phosphate salt particles have a BET specific surface area in the range of not less than 5 m$^2$/g and not more than 100 m$^2$/g. Examples thereof include $Li_3PO_4$, LiPON, $Li_2HPO_4$, $Li_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$ and $MgHPO_4$. Of these, to prevent side reactions, it is preferable that the phosphate salt particles be selected from at least one of lithium phosphate ($Li_3PO_4$), dilithium hydrogen phosphate ($Li_2HPO_4$) and lithium dihydrogen phosphate ($LiH_2PO_4$).

The BET specific surface area of the phosphate salt particles contained in the first filler layer 30 is in the range of not less than 5 m$^2$/g and not more than 100 m$^2$/g, and preferably in the range of not less than 20 m$^2$/g and not more than 100 m²/g. In consideration of the temperatures experienced during battery production, the battery inside temperatures during normal use, and the battery inside temperatures at the time of abnormalities, it is generally preferable that the phosphate salt particles be melted at 140° C. to 190° C. to close pores in the second filler layer 32. When the BET specific surface area is in the above range, the phosphate salt particles are melted at 140° C. to 190° C. to close pores in the second filler layer 32, thus making it possible to reduce the amount of heat generated at the time of battery abnormalities. If, on the other hand, the BET specific surface area of the phosphate salt particles is less than 5 m²/g, the amount of the phosphate salt melted at 140° C. to 190° C. is small as compared to when the above range is satisfied, and consequently the pores in the second filler layer 32 cannot be closed sufficiently with the result that the amount of heat generated at the time of battery abnormalities cannot be reduced to a sufficient extent. If the BET specific surface area of the phosphate salt particles is more than 100 m²/g, the packing density of the first filler layer 30 is low as compared to when the above range is satisfied, and consequently the melt of the phosphate salt cannot close sufficiently the pores in the second filler layer 32 with the result that the amount of heat generated at the time of battery abnormalities is sometimes increased. The BET specific surface area of the phosphate salt particles may be measured by the BET method (the nitrogen adsorption method) described in JIS R1626.

For example, the average particle size of the phosphate salt particles contained in the first filler layer 30 is preferably not less than 0.05 μm and not more than 2 μm. If the phosphate salt particles fail to satisfy the above range of average particle size, the amount of heat generated at the time of battery abnormalities is sometimes increased as compared to when the above range is satisfied. Here the average particle size is the volume average particle size measured by a laser diffraction method at which the cumulative volume value reaches 50% median of the particle size distribution. The average particle size may be measured with, for example, a laser diffraction scattering grain size distribution analyzer (manufactured by HORIBA, Ltd.).

To take advantages such as that the mechanical strength of the layer can be increased and the adhesion with respect to other layers can be enhanced, the first filler layer 30 preferably includes a binder. Examples of the binders include polyolefins such as polyethylene and polypropylene, fluororesins such as polyvinylidene fluoride (PVDF), polytetrafluoroethylene (PTFE) and polyvinyl fluoride (PVF), fluororubbers such as vinylidene fluoride-hexafluoropropylene-tetrafluoroethylene copolymer and ethylene-tetrafluoroethylene copolymer, rubbers such as styrene-butadiene copolymer and hydrides thereof, acrylonitrile-butadiene copolymer and hydrides thereof, acrylonitrile-butadiene-styrene copolymer and hydrides thereof, methacrylate ester-acrylate ester copolymer, styrene-acrylate ester copolymer, acrylonitrile-acrylate ester copolymer, ethylene propylene rubber, polyvinyl alcohol and polyvinyl acetate, resins such as polyphenylene ether, polysulfone, polyethersulfone, polyphenylenesulfide, polyetherimide, polyamideimide, polyamide, polyesters, polyacrylonitrile, cellulose, ethylene-vinyl acetate copolymer, polyvinyl chloride, isoprene rubber, butadiene rubber, polymethyl acrylate, polyethyl acrylate and polyvinyl alcohol, and water-soluble polymers such as carboxymethylcellulose (CMC), acrylamide, polyvinyl alcohol, methylcellulose, guar gum, sodium alginate, carrageenan and xanthan gum, and salts thereof. A single, or two or more kinds of these materials may be used. The binders may be used singly, or two or more may be used in combination.

The first filler layer 30 preferably includes a heteropolyacid. The addition of a heteropolyacid promotes the polycondensation of the phosphate salt melted at the time of battery abnormality, and allows the pores in the second filler layer 32 to be closed more efficiently, thus attaining a further reduction in the amount of heat generated from the battery. Examples of the heteropolyacids include phosphomolybdic acid, phosphotungstic acid, phosphomolybdotungstic acid, phophomolybdovanadic acid, phosphomolybdotungstovanadic acid, phosphotungstovanadic acid, silicotungstic acid, silicomolybdic acid, silicomolybdotungstic acid and silicomolybdotungstovanadic acid. Of these, one or more selected from silicotungstic acid, phosphomolybdic acid and phosphotunystic acid are preferable from points of view such as the stability of polymerization and the stability of the heteropolyacid itself.

The content of the phosphate salt particles in the first filler layer 30 is preferably an amount enough to close the pores in the second filler layer 32. For example, the content is preferably not less than 90 mass %, and preferably in the range of not less than 92 mass % and not more than 96 mass %.

The thickness of the first filler layer 30 is not particularly limited, but is, for example, preferably in the range of not less than 1 μm and not more than 10 μm, more preferably in the range of not less than 1 μm and not more than 5 μm, and still more preferably in the range of not less than 2 μm and not more than 4 μm. From the point of view of reducing the amount of heat generated from the battery, the thickness of the first filler layer 30 is preferably not less than 2 times and not more than 40 times, and more preferably not less than 3 times and not more than 20 times the average particle size of the phosphate salt particles.

For purposes such as to ensure good ion conductivity during the charging and discharging of the battery and to ensure physical strength, the porosity of the first filler layer 30 is, for example, preferably not less than 30% and not more than 70%. Porosity (%) of first filler layer=100−[[W÷(d×ρ)]×100] where W: basis weight (g/cm²) of first filler layer, d: thickness (cm) of first filler layer, and ρ: average density (g/cm³) of first filler layer.

The inorganic particles contained in the second filler layer 32 are not particularly limited as long as they are inorganic particles which are more heat resistant than the phosphate salt particles contained in the first filler layer 30 (that is, inorganic particles having a higher melting point than the phosphate salt particles). To prevent the occurrence of short-circuits between the positive and negative electrodes, for example, inorganic particles having high electrical insulating properties are preferable. Examples of the inorganic particles include metal oxides, metal oxide hydrates, metal hydroxides, metal nitrides, metal carbides and metal sulfides. Examples of the metal oxides and the metal oxide hydrates include aluminum oxide (alumina, $Al_2O_3$), boehmite ($Al_2O_3H_2O$ or AlOOH), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$) and zinc oxide (ZnO). Examples of the metal nitrides include silicon nitride ($Si_3N_4$), aluminum nitride (AlN), boron nitride (BN) and titanium nitride (TiN). Examples of the metal carbides include silicon carbide (SiC) and boron carbide ($B_4C$). Examples of the metal sulfides include barium sulfate ($BaSO_4$). Examples of the metal hydroxides include aluminum hydroxide ($Al(OH)_3$). Further, use may be made of porous aluminosilicate salts such as zeolite ($M_{2/n}O \cdot Al_2O_3 \cdot xSiO_2 \cdot yH_2O$ wherein M denotes a metal element, $x \geq 2$ and $y \geq 0$), layered silicate salts such as talc ($Mg_3Si_4O_{10}(OH)_2$), and minerals such as barium titanate ($BaTiO_3$) and strontium titanate ($SrTiO_3$). Of these, from points of view such as electrical insulating properties and high melting point, it is preferable that the inorganic particles be selected from at least one of alumina, boehmite, talc, titania, silica and magnesia. In the present invention, the melting point of a material which melts after transformation, for example, boehmite into alumina, is the melting point of the material resulting from the transformation.

For example, the average particle size of the inorganic particles contained in the second filler layer 32 is preferably not less than 0.2 μm and not more than 2 μm. If the inorganic particles fail to satisfy the above range of average particle size, the amount of heat generated at the time of battery abnormalities is sometimes increased as compared to when the above range is satisfied.

To take advantages such as that the mechanical strength of the layer can be increased and the adhesion with respect to other layers can be enhanced, the second filler layer 32 preferably includes a binder. Examples of the binders include those binders used in the first filler layer 30.

For purposes such as, for example, to ensure the heat resistance of the second filler layer 32, the content of the inorganic particles in the second filler layer 32 is, for example, preferably not less than 90 mass %, and preferably in the range of not less than 92 mass % and not more than 98 mass %.

The thickness of the second filler layer 32 is not particularly limited, but is, for example, preferably in the range of not less than 1 μm and not more than 5 μm, and more preferably in the range of not less than 2 μm and not more than 4 μm.

For purposes such as to ensure good ion conductivity during the charging and discharging of the battery and to ensure physical strength, the porosity of the second filler layer 32 is, for example, preferably not less than 30% and not more than 70%. The porosity of the second filler layer 32 is calculated by the equation described hereinabove for calculating the porosity of the first filler layer 30.

Figure 3:
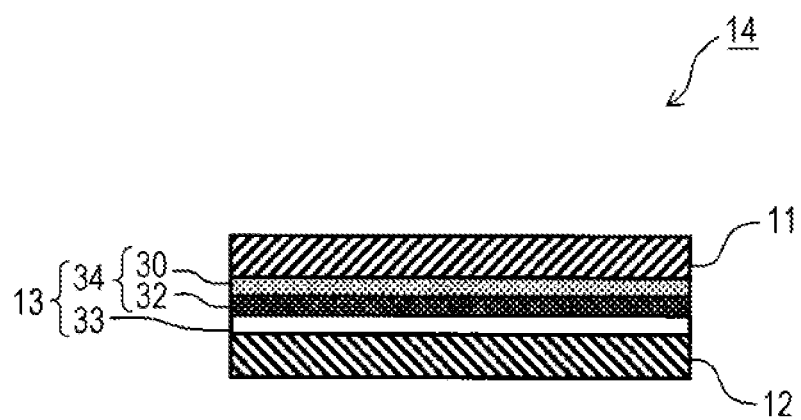
FIG. 3 is a partial enlarged sectional view illustrating another example of the wound electrode assembly illustrated in FIG. 1.

FIG. 3 is a partial enlarged sectional view illustrating another example of the wound electrode assembly illustrated in FIG. 1. In the electrode assembly 14 illustrated in FIG. 3, a separator 13 disposed between a positive electrode 11 and a negative electrode 12 includes: an inorganic filler layer 34 that includes a first filler layer 30 containing phosphate salt particles and a second filler layer 32 containing inorganic particles more heat resistant than the phosphate salt particles; and a porous sheet 33 disposed on the inorganic filler layer 34, the inorganic filler layer 34 being disposed between the porous sheet 33 and the positive electrode 11. The first filler layer 30 and the second filler layer 32 are the same as described hereinabove, and the description thereof is omitted.

For example, the porous sheet 33 is a sheet having ion permeability and insulating properties, and examples thereof include microporous thin film, woven fabrics and nonwoven fabrics. For example, the porous sheet 33 is composed of a polyolefin resin such as polyethylene or polypropylene, an acrylic resin, a styrene resin, a polyester resin, a cellulose or the like. The porous sheet 33 may be a stack including a cellulose fiber layer and a thermoplastic resin fiber layer such as of polyolefin.

The thickness of the porous sheet 33 is not particularly limited but is, for example, preferably in the range of not less than 3 μm and not more than 20 μm.

To ensure ion conductivity during the charging and discharging of the battery, the porosity of the porous sheet 33 is, for example, preferably in the range of not less than 30% and not more than 70%. To determine the porosity of the porous sheet 33, ten circles 2 cm in diameter are punched out from the porous sheet 33 in the direction of thickness of the porous sheet 33, and the thickness h of the central portion and the mass w are measured with respect to each of the circles punched out from the porous sheet 33. Further, the volume V and mass W of the total of the ten circles of the porous sheet 33 are determined based on the thicknesses h and the masses w, and the porosity ε is calculated using the following equation.

$$\text{Porosity } \varepsilon(\%) = ((\rho V - W)/(\rho V)) \times 100 \text{ where } \rho: \text{density of material of porous sheet}$$

Preferably, the average particle size of the phosphate salt particles is 0.05 μm to 1 μm and is smaller than the average pore size of the porous sheet 33. By using phosphate salt particles having an average particle size smaller than the average pore size of the porous sheet 33, part of the phosphate salt particles penetrate into the pores of the porous sheet 33 and easily close the pores of the porous sheet 33 in the event of the occurrence of short-circuiting. The depth in which the phosphate salt particles penetrate into the pores of the porous sheet 33 is preferably not less than 0.1 μm and not more than 1 μm in the direction of thickness of the porous sheet 33.

An example method for producing the separator 13 will be described. Provided first are a first slurry containing components such as phosphate salt particles, and a second slurry containing components such as inorganic particles. Next, the second slurry is applied onto a porous sheet 33 and is dried to form a second filler layer 32, and the first slurry is applied onto the second filler layer 32 and is dried to form a first filler layer 30, thus fabricating a separator. Incidentally, the first slurry and the second slurry may be applied to a positive electrode 11 or a negative electrode 12. This method is suited when no porous sheet 33 is used.

[Positive Electrodes]

For example, the positive electrode 11 is composed of a positive electrode current collector such as a metal foil, and a positive electrode mixture layer disposed on the positive electrode current collector. The positive electrode current collector may be, for example, a foil of a metal that is stable at positive electrode potentials, such as aluminum, or a film having such a metal as a skin layer.

The positive electrode mixture layer includes a positive electrode active material. Further, the positive electrode mixture layer preferably includes a conductive agent and a binder in addition to the positive electrode active material. The thickness of the positive electrode mixture layer is, for example, not less than 10 μm.

For example, the positive electrode 11 may be fabricated by preparing a positive electrode mixture slurry including a positive electrode active material, a conductive agent and a binder, applying the positive electrode mixture slurry onto a positive electrode current collector, drying the wet film to form a positive electrode mixture layer, and pressing the positive electrode mixture layer.

For example, the positive electrode active material may be a lithium transition metal oxide containing a transition metal element such as Co, Mn or Ni. To attain an enhancement in the capacity of the nonaqueous electrolyte secondary battery, for example, the lithium transition metal oxide is preferably a Ni-containing lithium transition metal oxide which contains nickel (Ni) and has a Ni proportion of not less than 30 mol % relative to the total number of moles of the metal element(s) except lithium (Li). An example of the Ni-containing lithium transition metal oxides is an oxide represented by the compositional formula $Li_aNi_xM_{(1-x)}O_2$ ($0.95 \leq a \leq 1.2$, $0.3 \leq x < 1.0$, and M denotes a metal element other than Li and Ni). The metal M in the formula may include, for example, at least one selected from cobalt (Co), manganese (Mn), tungsten (W), niobium (Nb), molybdenum (Mo), phosphorus (P) and sulfur (S). The oxide may further contain at least one selected from magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), zirconium (Zr), tin (Sn), antimony (Sb), lead (Pb) and bismuth (Bi). Of these, Co, Mn, etc. are preferable.

Examples of the conductive agents include carbon materials such as carbon black, acetylene black, Ketjen black and graphite. The conductive agents may be used singly, or two or more may be used in combination.

Examples of the binders include fluororesins such as polytetrafluoroethylene (PTFE) and polyvinylidene fluoride (PVdF), polyacrylonitriles (PAN), polyimides, acrylic resins and polyolefins. These resins may be used in combination with, for example, carboxymethylcellulose (CMC) or a salt thereof, or polyethylene oxide (PEO). The binders may be used singly, or two or more may be used in combination.

[Negative Electrodes]

For example, the negative electrode 12 is composed of a negative electrode current collector made of a metal foil or the like, and a negative electrode mixture layer disposed on the current collector. The negative electrode current collector may be, for example, a foil of a metal that is stable at negative electrode potentials, such as copper, or a film having such a metal as a skin layer. The negative electrode mixture layer includes a negative electrode active material and a binder. For example, the negative electrode 12 may be fabricated by preparing a negative electrode mixture slurry including components such as a negative electrode active material and a binder, applying the negative electrode mixture slurry onto a negative electrode current collector, drying the wet film to form a negative electrode mixture layer, and pressing the negative electrode mixture layer.

The negative electrode active material is not particularly limited as long as it can reversibly store and release lithium ions. Examples thereof include carbon materials such as natural graphite and artificial graphite, metals which can be alloyed with lithium such, as silicon (Si) and tin (Sn), and alloys and composite oxides containing such metal elements as Si and Sn. The negative electrode active materials may be used singly, or two or more may be used in combination.

Examples of the binders include fluororesins, PAN, polyimides, acrylic resins and polyolefins, similarly to the case of the positive electrode. When the mixture slurry is prepared using an aqueous solvent, it is preferable to use, for example, CMC or a salt thereof, styrene-butadiene rubber (SBR), polyacrylic acid (PAA) or a salt thereof, or polyvinyl alcohol (PVA).

[Nonaqueous Electrolytes]

The nonaqueous electrolyte includes a nonaqueous solvent and a solute (an electrolyte salt) dissolved in the nonaqueous solvent. Examples of the nonaqueous solvents include esters, ethers, nitriles, amides such as dimethylformamide, isocyanates such as hexamethylene diisocyanate, and mixtures of two or more kinds of these solvents. The nonaqueous solvent may include a halogenated solvent resulting from the substitution of the above solvent with a halogen atom such as fluorine in place of at least part of hydrogen.

Examples of the esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methyl propyl carbonate, ethyl propyl carbonate and methyl isopropyl carbonate, cyclic carboxylate esters such as γ-butyrolactone and γ-valerolactone, and chain carboxylate esters such as methyl acetate, ethyl acetate, propyl acetate, methyl propionate (MP) and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

Examples of the nitriles include acetonitrile, propionitrile, butyronitrile, valeronitrile, n-heptanitrile, succinonitrile, glutaronitrile, adiponitrile, pimelonitrile, 1,2,3-propanetricarbonitrile, and 1,3,5-pentanetricarbonitrile.

Examples of the halogenated solvents include fluorinated cyclic carbonate esters such as fluoroethylene carbonate (FEC), fluorinated chain carbonate esters, and fluorinated chain carboxylate esters such as fluoromethyl propionate (FMP).

Examples of the electrolyte salts include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, and n is 1 or 2), $LiB_{10}Cl_{10}$, LiCl, LiBr, LiI, chloroborane lithium, lower aliphatic carboxylic acid lithiums, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (l and m are integers of 1 or greater). These electrolyte salts may be used singly, or a plurality thereof may be used as a mixture. The concentration of the electrolyte salt is, for example, 0.8 to 1.8 mol per L of the nonaqueous solvent.

EXAMPLES

Hereinbelow, the present disclosure will be further described based on EXAMPLES. However, it should be construed that the scope of the present disclosure is not limited to such EXAMPLES.

Example 1

[Fabrication of Separator]

Lithium phosphate particles ($Li_3PO_4$, BET specific surface area: 54.07 $m^2$/g, average particle size D50: 0.93 μm) and poly-N-vinylacetamide as a binder were mixed together in a mass ratio of 100:6.5, N-methyl-2-pyrrolidone (NMP) was added. A first slurry having a solid concentration of 15.0 mass % was thus prepared. Further, boehmite particles (average particle size D50: 0.7 μm) as inorganic particles and poly-N-vinylacetamide as a binder were mixed together in a mass ratio of 100:6.5. NMP was added. A second slurry having a solid concentration of 15.0 mass % was thus prepared. The second slurry was applied with a wire bar onto a side of a 12 μm thick polyethylene porous sheet so that the coating mass after drying would be 6 g/m², and the wet film was dried to form a second filler layer containing the inorganic particles. The thickness of the second filler layer was 4 μm. Further, the first slurry was applied with a wire bar onto the second filler layer so that the coating mass after drying would be 6.4 g/m², and the wet film was dried to form a first filler layer containing the phosphate salt. The thickness of the first filler layer obtained was 4 μm.

(Fabrication of Positive Electrode)

Lithium composite oxide particles represented by $L_{1.05}Ni_{0.82}Co_{0.15}Al_{0.03}O_2$ as a positive electrode active material, carbon black as a conductive agent, and polyvinylidene fluoride as a binder were mixed together in a mass ratio of 100:1:1 in NMP solution to give a positive electrode mixture slurry. Next, the positive electrode mixture slurry was applied to both sides of an aluminum foil as a positive electrode current collector. The wet films were dried and rolled with a roller. Further, a current collector tab made of aluminum was attached. Thus, a positive electrode was fabricated in which positive electrode mixture layers were disposed on both sides of the positive electrode current collector. Incidentally, the packing density of the positive electrode active material in the positive electrode was 3.60 g/cm³.

[Fabrication of Negative Electrode]

Artificial graphite as a negative electrode active material, CMC (carboxymethylcellulose sodium) as a dispersant, and SBR (styrene-butadiene rubber) as a binder were mixed together in a mass ratio of 92:8:1:1 in aqueous solution to give a negative electrode mixture slurry. Next, the negative electrode mixture slurry was applied both sides of a copper foil as a negative electrode current collector. The wet films were dried and rolled with a roller. Further, a current collector tab made of nickel was attached. Thus, a negative electrode plate was fabricated in which negative electrode mixture layers were disposed on both sides of the negative electrode current collector. Incidentally, the packing density of the negative electrode active material in the negative electrode was 1.50 g/cm³.

[Preparation of Nonaqueous Electrolyte]

Lithium hexafluorophosphate ($LiPF_6$) was dissolved with a concentration of 1.0 mol/L into a mixed solvent obtained by mixing ethylene carbonate (EC), ethyl methyl carbonate (EMC) and dimethyl carbonate (DMC) in a volume ratio of 3:3:4. Further, vinylene carbonate (VC) was dissolved with a concentration of 1.0 mass % relative to the mixed solvent. A nonaqueous electrolyte was thus obtained.

[Fabrication of Nonaqueous Electrolyte Secondary Battery]

A nonaqueous electrolyte secondary battery was fabricated in the following procedures using the positive electrode, the negative electrode, the nonaqueous electrolyte and the separator. (1) The positive electrode, the separator and the negative electrode were stacked in the order named so that the first filler layer of the separator and the positive electrode were opposed to each other. The stack was coiled to give a wound electrode assembly. (2) Insulating plates were arranged on and under the electrode assembly, and the wound electrode assembly was placed into a cylindrical battery exterior case. (3) The current collector tab of the negative electrode was welded to the inner surface of the bottom of the battery exterior case, and the current collector tab of the positive electrode was welded to a bottom plate of a seal body. (4) The nonaqueous electrolyte was poured through the opening of the battery exterior case, and thereafter the battery exterior case was tightly closed with the seal body.

Example 2

A nonaqueous electrolyte secondary battery was fabricated in the same manner as in EXAMPLE 1, except that the lithium phosphate particles used in the fabrication of a separator in EXAMPLE 1 were replaced by dilithium hydrogen phosphate particles ($Li_2HPO_4$, BET specific surface area: 7.10 m²/g, volume average particle size D50: 0.33 μm). The thickness of the first filler layer was 3 μm.

Example 3

A nonaqueous electrolyte secondary battery was fabricated in the same manner as in EXAMPLE 1, except that the lithium phosphate particles used in the fabrication of a separator in EXAMPLE 1 were replaced by lithium phosphate particles ($Li_3PO_4$, BET specific surface area: 61.35 m²/g, volume average particle size D50: 3.34 μm). The thickness of the first filler layer was 10 μm.

Example 4

A nonaqueous electrolyte secondary battery was fabricated in the same manner as in EXAMPLE 1, except that the lithium phosphate particles used in the fabrication of a separator in EXAMPLE 1 were replaced by lithium phosphate particles ($Li_3PO_4$, BET specific surface area: 21.54 m²/g, volume average particle size D50: 1.42 μm). The thickness of the first filler layer was 5 μm.

Example 5

A nonaqueous electrolyte secondary battery was fabricated in the same manner as in EXAMPLE 1, except that the lithium phosphate particles used in the fabrication of a separator in EXAMPLE 1 were replaced by lithium phosphate particles ($Li_3PO_4$, BET specific surface area: 30.70 m²/g, volume average particle size D50: 1.18 μm).

Comparative Example 1

A nonaqueous electrolyte secondary battery was fabricated in the same manner as in EXAMPLE 1, except that the lithium phosphate particles used in the fabrication of a separator in EXAMPLE 1 were replaced by lithium phosphate particles ($Li_3PO_4$, BET specific surface area: 3.65 m²/g, volume average particle size D50: 1.60 μm). The thickness of the first filler layer was 5 μm.

Comparative Example 2

A nonaqueous electrolyte secondary battery was fabricated in the same manner as in EXAMPLE 1, except that in the fabrication of a separator, the second filler layer containing the inorganic particles was not formed, and the first slurry used in EXAMPLE 1 was applied to a side of the polyethylene porous sheet to form the first filler layer containing the phosphate salt.

Comparative Example 3

A nonaqueous electrolyte secondary battery was fabricated in the same manner as in EXAMPLE 1, except that the lithium phosphate particles used in the fabrication of a separator in EXAMPLE 1 were replaced by lithium phosphate particles ($Li_3PO_4$, BET specific surface area: 0.90 m$^2$/g, volume average particle size D50: 2.43 μm). The thickness of the first filler layer was 7 μm.

Comparative Example 4

A nonaqueous electrolyte secondary battery was fabricated in the same manner as in EXAMPLE 1, except that the lithium phosphate particles used in the fabrication of a separator in EXAMPLE 1 were replaced by dilithium hydrogen phosphate particles ($Li_2HPO_4$, BET specific surface area: 1.56 m$^2$/g, volume average particle size D50: 0.87 μm). The thickness of the first filler layer was 4 μm.

Comparative Example 5

[Fabrication of Separator]

Lithium phosphate particles ($Li_3PO_4$, BET specific surface area: 54.07 m$^2$/g, average particle size D50: 0.93 μm), boehmite particles as inorganic particles, and poly-N-vinylacetamide as a binder were mixed together in a mass ratio of 50:50:6.5. NMP was added. A slurry having a solid concentration of 15.0 mass % was thus prepared. The slurry was applied with a wire bar onto a side of a 12 μm thick polyethylene porous sheet so that the coating mass after drying would be 12.2 g/m$^2$, and the wet film was dried to form a first filler layer. The thickness of the first filler layer was 8 μm.

A nonaqueous electrolyte secondary battery was fabricated in the same manner as in EXAMPLE 1 using the above separator.

Comparative Example 6

A nonaqueous electrolyte secondary battery was fabricated in the same manner as in EXAMPLE 1, except that in the fabrication of a separator, the first filler layer containing the phosphate salt was not formed on the second filler layer containing the inorganic particles.

Comparative Example 7

A nonaqueous electrolyte secondary battery was fabricated in the same manner as in EXAMPLE 1, except that the 12 μm thick polyethylene porous sheet was used as a separator without forming the first filler layer containing the phosphate salt and the second filler layer containing the inorganic particles.

[Measurement of Amount of Heat Generation]

The amount of heat generation was measured by differential scanning calorimetry (DSC) under the following conditions.

In an atmosphere at 25° C., the nonaqueous electrolyte secondary batteries of EXAMPLES 1 to 5 and COMPARATIVE EXAMPLES 1 to 7 were each charged at a constant charging current of 0.3 It to a battery voltage of 4.2 V, further charged at a constant battery voltage of 4.2 V until the current value reached 0.05 It, and disassembled in a glove box in an argon atmosphere. Next, the positive electrode, the negative electrode and the separator were washed with DMC and dried. The positive electrode and the negative electrode were hollowed to give circular pieces having a diameter of 2.5 mm, and the separator was hollowed to give a circular piece 3.0 mm in diameter. The pieces were stacked in the order of the positive electrode, the separator and the negative electrode in such a manner that the first filler layer of the separator was opposed to the positive electrode. The stack was inserted into a stainless steel pan, 3.5 μL of the nonaqueous electrolyte was poured, and the pan was tightly closed. The sample was analyzed by differential scanning calorimetry (DSC) while increasing the temperature from 35° C. to 350° C. at a heat-up rate of 2° C./min, and the amount of heat generated at 100° C. to 300° C. was measured.

Table 1 describes the amounts of heat generation in EXAMPLES and COMPARATIVE EXAMPLES.

TABLE 1

| | Separator | | | | | Battery characteristics |
|---|---|---|---|---|---|---|
| | First filler layer | | | | | |
| | Phosphate salt | BET (m$^2$/g) of phosphate salt | Average particle size (μm) of phosphate salt | Inorganic particles | Second filler layer Inorganic particles | Amount of DSC heat generation (J) |
| EX. 1 | $Li_3PO_4$ | 54.07 | 0.93 | — | Boehmite | 11.26 |
| EX. 2 | $Li_2HPO_4$ | 7.10 | 0.33 | — | Boehmite | 11.40 |
| EX. 3 | $Li_3PO_4$ | 61.35 | 3.34 | — | Boehmite | 10.72 |
| EX. 4 | $Li_3PO_4$ | 21.54 | 1.42 | — | Boehmite | 10.86 |
| EX. 5 | $Li_3PO_4$ | 30.07 | 1.18 | — | Boehmite | 10.75 |
| COMP. EX. 1 | $Li_3PO_4$ | 3.65 | 1.60 | — | Boehmite | 12.15 |
| COMP. EX. 2 | $Li_3PO_4$ | 54.07 | 0.93 | — | — | 12.37 |
| COMP. EX. 3 | $Li_3PO_4$ | 0.90 | 2.43 | — | Boehmite | 11.79 |
| COMP. EX. 4 | $Li_2HPO_4$ | 1.56 | 0.87 | — | Boehmite | 11.83 |
| COMP. EX. 5 | $Li_3PO_4$ | 54.07 | 0.93 | Boehmite | — | 12.33 |
| COMP. EX. 6 | — | — | — | — | Boehmite | 12.02 |
| COMP. EX. 7 | — | — | — | — | — | 13.38 |

EXAMPLES 1 to 5 attained a smaller amount of heat generation than COMPARATIVE EXAMPLES 1 to 7. It can be thus said that the amount of heat generated from a battery in the event of an abnormality in the battery is reduced by using a nonaqueous electrolyte secondary battery which includes a positive electrode, a negative electrode and a separator disposed between the positive electrode and the negative electrode, wherein the separator includes an inorganic filler layer which includes a first filler layer containing phosphate salt particles and a second filler layer disposed on the first filler layer and containing inorganic particles more heat resistant than the phosphate salt particles, and the BET specific surface area of the phosphate salt particles is in the range of not less than 5 m$^2$/g and not more than 100 m$^2$/g.

Example 6

[Fabrication of Separator]

Lithium phosphate particles ($Li_3PO_4$, BET specific surface area: 54.07 m$^2$/g, average particle size D50: 0.93 μm), phosphotungstic acid as a heteropolyacid, and poly-N-vinylacetamide as a binder were mixed together in a mass ratio of 100:5:6.5. NMP was added. A first slurry having a solid concentration of 15.0 mass % was thus prepared. Further, boehmite particles (average particle size D50: 0.7 μm) as inorganic particles and poly-N-vinylacetamide as a binder were mixed together in a mass ratio of 100:6.5. NMP was added. A second slurry having a solid concentration of 15.0 mass % was thus prepared. The second slurry was applied with a wire bar onto a side of a 12 μm thick polyethylene porous sheet so that the coating mass after drying would be 6 g/m$^2$, and the wet film was dried to form a second filler layer containing the inorganic particles. The thickness of the second filler layer was 4 μm. Further, the first slurry was applied with a wire bar onto the second filler layer so that the coating mass after drying would be 6.4 g/m$^2$, and the wet film was dried to form a first filler layer containing the phosphate salt and the heteropolyacid. The thickness of the first filler layer obtained was 4 μm.

A nonaqueous electrolyte secondary battery was fabricated in the same manner as in EXAMPLE 1 using the above separator.

Example 7

A nonaqueous electrolyte secondary battery was fabricated in the same manner as in EXAMPLE 6, except that the phosphotungstic acid used in the fabrication of a separator in EXAMPLE 6 was replaced by silicotungstic acid. The thickness of the first filler layer was 4 μm.

Example 8

A nonaqueous electrolyte secondary battery was fabricated in the same manner as in EXAMPLE 6, except that the phosphotungstic acid used in the fabrication of a separator in EXAMPLE 6 was replaced by phosphomolybdic acid. The thickness of the first filler layer was 4 μm.

Example 9

A nonaqueous electrolyte secondary battery was fabricated in the same manner as in EXAMPLE 6, except that the lithium phosphate particles used in the fabrication of a separator in EXAMPLE 6 were replaced by dilithium hydrogen phosphate particles ($Li_2HPO_4$, BET specific surface area: 7.10 m$^2$/g, volume average particle size D50: 0.33 μm). The thickness of the first filler layer was 3 μm.

Example 10

A nonaqueous electrolyte secondary battery was fabricated in the same manner as in EXAMPLE 6, except that in the fabrication of a separator, the phosphotungstic acid in EXAMPLE 6 was replaced by silicotungstic acid, and the lithium phosphate particles in EXAMPLE 6 were replaced by dilithium hydrogen phosphate particles ($Li_2HPO_4$, BET specific surface area: 7.10 m$^2$/g, volume average particle size D50: 0.33 μm). The thickness of the first filler layer was 3 μm.

Example 11

A nonaqueous electrolyte secondary battery was fabricated in the same manner as in EXAMPLE 6, except that in the fabrication of a separator, the phosphotungstic acid in EXAMPLE 6 was replaced by phosphomolybdic acid, and the lithium phosphate particles in EXAMPLE 6 were replaced by dilithium hydrogen phosphate particles ($Li_2HPO_4$, BET specific surface area: 7.10 m$^2$/g, volume average particle size D50: 0.33 μm). The thickness of the first filler layer was 3 μm.

Comparative Example 8

A nonaqueous electrolyte secondary battery was fabricated in the same manner as in EXAMPLE 6, except that in the fabrication of a separator, the second filler layer containing the inorganic particles was not formed, and the first slurry used in EXAMPLE 6 was applied to a side of the polyethylene porous sheet to form the first filler layer containing the phosphate salt and the heteropolyacid.

In EXAMPLES 6 to 11 and COMPARATIVE EXAMPLE 8, the amount of heat generation was measured by the differential thermal scanning calorimetry (DSC) described hereinabove. The results are described in Table 2.

TABLE 2

| | Separator | | | | | Battery characteristics |
|---|---|---|---|---|---|---|
| | First filler layer | | | | | |
| | Phosphate salt | BET (m$^2$/g) of phosphate salt | Average particle size (μm) of phosphate salt | Heteropoly acid | Second filler layer Inorganic particles | Amount of DSC heat generation (J) |
| EX. 6 | $Li_3PO_4$ | 54.07 | 0.93 | Phosphotungstic acid | Boehmite | 10.66 |
| EX. 7 | $Li_3PO_4$ | 54.07 | 0.93 | Silicotungstic acid | Boehmite | 10.8 |
| EX. 8 | $Li_3PO_4$ | 54.07 | 0.93 | Phosphomolybdic acid | Boehmite | 10.92 |
| EX. 9 | $Li_2HPO_4$ | 7.10 | 0.33 | Phosphotungstic acid | Boehmite | 10.16 |
| EX. 10 | $Li_2HPO_4$ | 7.10 | 0.33 | Silicotungstic acid | Boehmite | 10.27 |
| EX. 11 | $Li_2HPO_4$ | 7.10 | 0.33 | Phosphomolybdic acid | Boehmite | 9.01 |
| COMP. EX. 8 | $Li_3PO_4$ | 54.07 | 0.93 | Phosphotungstic acid | — | 12.75 |

The comparison of EXAMPLE 1 with EXAMPLES 6 to 8 shows that the amount of heat generation was smaller in EXAMPLES 6 to 8. Further, the comparison of EXAMPLE 2 with EXAMPLES 9 to 11 shows that the amount of heat generation was smaller in EXAMPLES 9 to 11. It can be thus said that the amount of heat generated from a battery in the event of an abnormality in the battery is further reduced by adding a heteropolyacid to the first filler layer containing phosphate salt particles with a BET specific surface area in the range of not less than 5 m$^2$/g and not more than 100 m$^2$/g. Incidentally, as shown by the results of COMPARA- TIVE EXAMPLE 8, the amount of heat generated from a battery in the event of an abnormality in the battery is not sufficiently reduced when the second filler layer containing inorganic particles more heat resistant than the phosphate salt particles is not disposed on the first filler layer.

REFERENCE SIGNS LIST

10 NONAQUEOUS ELECTROLYTE SECONDARY BATTERY
11 POSITIVE ELECTRODE
12 NEGATIVE ELECTRODE
13 SEPARATOR
14 ELECTRODE ASSEMBLY
15 CASE BODY
16 SEAL BODY
17, 18 INSULATING PLATES
19 POSITIVE ELECTRODE LEAD
20 NEGATIVE ELECTRODE LEAD
21 OVERHANG
22 FILTER
22a FILTER OPENING
23 LOWER VALVE
24 INSULATING MEMBER
25 UPPER VALVE
26 CAP
26a CAP OPENING
27 GASKET
30 FIRST FILLER LAYER
32 SECOND FILLER LAYER
33 POROUS SHEET
34 INORGANIC FILLER LAYER

The invention claimed is:

1. A nonaqueous electrolyte secondary battery comprising a positive electrode, a negative electrode and a separator disposed between the positive electrode and the negative electrode, wherein the separator comprises an inorganic filler layer which includes a first filler layer containing phosphate salt particles and a second filler layer disposed on the first filler layer and containing inorganic particles more heat resistant than the phosphate salt particles, the inorganic filler layer is of a laminated construction in order of the first filler layer and the second filler layer from a positive electrode side, the separator comprises a porous sheet disposed on the inorganic filler layer, the inorganic filler layer being disposed between the porous sheet and the positive electrode, the BET specific surface area of the phosphate salt particles is in the range of not less than 5 $m^2/g$ and not more than 100 $m^2/g$, and the phosphate salt particles are contained in an amount of not less than 90 mass % and not more than 98 mass % in the first filler layer.

2. The nonaqueous electrolyte secondary battery according to claim 1, wherein the BET specific surface area of the phosphate salt particles is in the range of not less than 20 $m^2/g$ and not more than 100 $m^2/g$.

3. The nonaqueous electrolyte secondary battery according to claim 1, wherein the phosphate salt particles are selected from at least one of dilithium hydrogen phosphate, lithium dihydrogen phosphate and lithium phosphate.

4. The nonaqueous electrolyte secondary battery according to claim 1, wherein the average particle size of the phosphate salt particles is 0.05 μm to 1 μm and is smaller than the average pore size of the porous sheet.

5. The nonaqueous electrolyte secondary battery according to claim 1, wherein the first filler layer includes a heteropolyacid.

* * * * *